United States Patent [19]
Watson

[11] 4,456,028
[45] Jun. 26, 1984

[54] RELIEF GATE VALVE
[75] Inventor: Richard R. Watson, Cypress, Tex.
[73] Assignee: Gilmore Valve Company, Bellaire, Tex.
[21] Appl. No.: 299,555
[22] Filed: Sep. 4, 1981
[51] Int. Cl.³ ............................................. F16K 17/26
[52] U.S. Cl. ................................... 137/493; 137/509; 251/175; 251/176
[58] Field of Search ....................... 137/493, 494, 509; 251/175, 176, 193, 284

[56] References Cited
U.S. PATENT DOCUMENTS

| | | | |
|---|---|---|---|
| 2,886,283 | 5/1959 | Natho | 251/284 |
| 2,959,189 | 11/1960 | Natho | 137/625.65 |
| 3,215,163 | 11/1965 | Henderson | 251/186 X |
| 3,348,567 | 10/1967 | Volpin | 251/176 |
| 3,601,149 | 8/1971 | Gilmore | 137/494 |
| 3,917,220 | 11/1975 | Gilmore | 251/176 X |
| 4,076,042 | 2/1978 | Larsen | 137/494 |
| 4,245,667 | 1/1981 | Braukmann | 137/493 |

Primary Examiner—Alan Cohan
Assistant Examiner—John A. Rivell
Attorney, Agent, or Firm—Robinson Murray; Ned L. Conley; David A. Rose

[57] ABSTRACT

A valve comprises a hollow body having an inlet and an outlet, a seat ring in the outlet provides a face adapted to engage a gate, a closure mounted for movement relative to the seat ring and including a carrier having a passage therethrough in which are slidably disposed a lipped gate disc adapted to engage the seat face and block the outlet when the valve is in closed position, a pressure spring pressing the gate disc against the seat face when the valve is in closed position, and a ball transferring the reaction of the spring to the body. The closure further includes a stem extending into a port through the body, a plate engaging said tip, a helical spring engaging the plate, and a screw cap encompassing the length of the spring and threadedly engaging a threaded cuff extending from the body, the cap bearing on the spring at its end opposite from that which engages the plate, the helical spring urging the valve closure to closed position whereat a shoulder on the closure engages the seat ring, providing a travel limit stop, and retaining the closure in the body. An outlet part secured to the body over the outlet retains the seat ring in the body. The area of the disc exposed to outlet pressure is less than the area of the cross-section of the stem where it enters said port.

14 Claims, 4 Drawing Figures

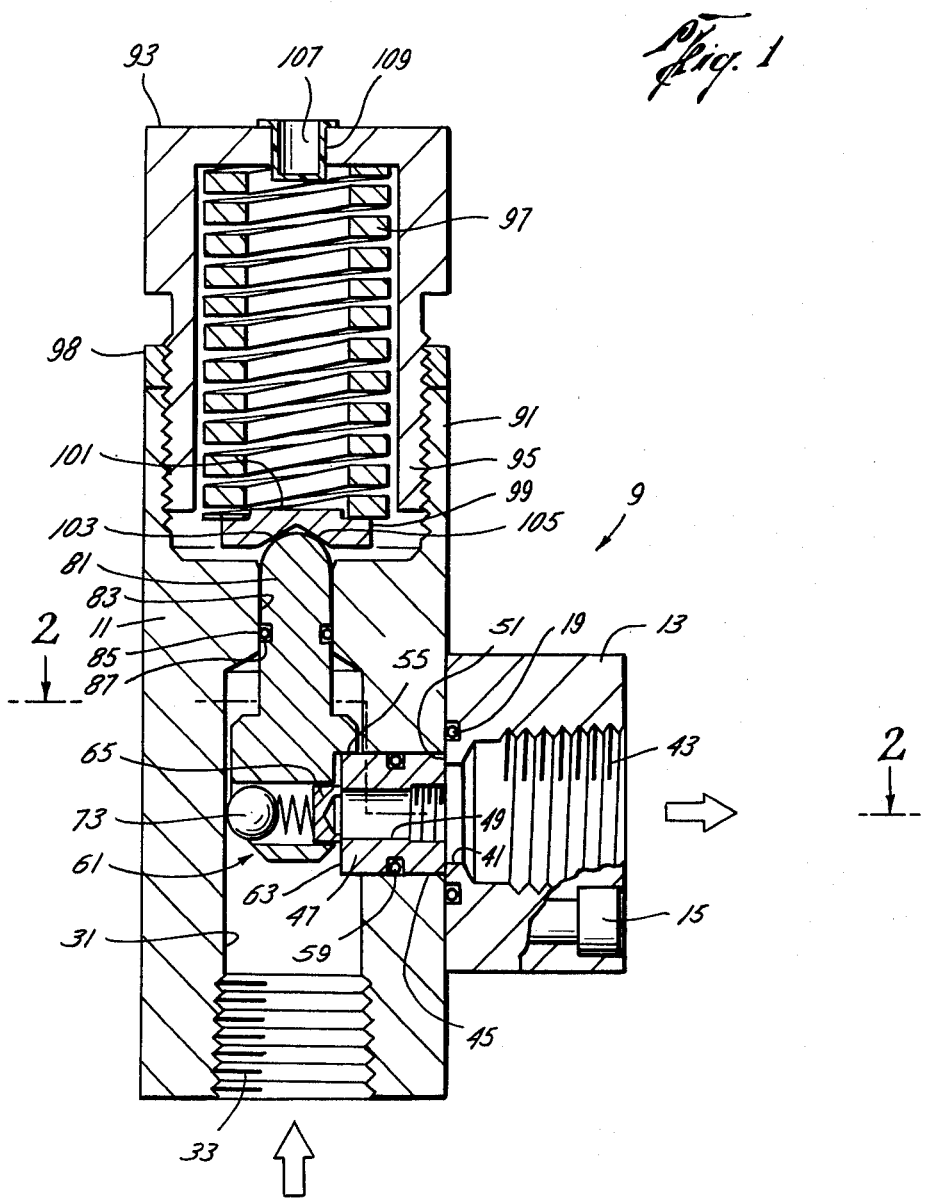

4,456,028

RELIEF GATE VALVE

SUMMARY OF THE INVENTION

A relief gate valve which includes a body having an axial passage, one end of which forms the valve inlet, and a lateral passage transecting the axial passage, the outer end of the lateral passage forming the valve outlet. The inner end of the lateral passage is provided with a replaceable valve seat.

A valve closure moves axially in the axial passage parallel to the face of the valve seat. The closure includes a carrier peripherally spaced from the walls of the axial passage and having an axial stem passing through a stem port in the body at the end of the axial passage opposite from the inlet. The stem makes a sliding fit with the port to guide the closure as it moves axially. One side of a plate rests on the outer end of the stem and the other side of the plate is engaged by one end of a helical compression load spring. A cap rests on the other end of the spring and is provided with a tubular skirt which threadingly engages a cuff extending from the valve body.

The carrier is provided with a transverse cylindrical passage within which is disposed coaxially a helical pressure spring bearing at one end against a ball that is adapted to roll and slide within the transverse passage and against the wall of the axial passage. The other end of the pressure spring presses against a seal disc or gate which engages the valve seat.

The valve seat protrudes into the axial passage and engages a shoulder on the carrier to limit axial travel of the carrier in the direction of extension of the load spring, whereby the seal disc is normally positioned over the valve seat to prevent flow through the lateral passage. Sufficient fluid pressure at the valve, however, will cause the carrier to move in the direction of contraction of the load spring, thereby unseating the seal disc and opening the valve.

To facilitate manufacture and to enable easy replacement of the valve seat, the body is made in two parts including a main part and an outlet part, the parts being held together by screws.

DEVELOPMENT OF THE INVENTION

A relief valve manufactured by applicant's assignee is the subject of U.S. Pat. No. 3,601,149-Gilmore, the disclosure of which is incorporated herein by reference. The present invention provides a more economical construction for the same purpose. Although the valve is not balanced to render gate-seat friction independent of downstream pressure (a feature of the Gilmore patent construction), the carrier is still balanced with respect to lateral forces, the pressure spring reaction being taken by the ball, which bears against the inside of the valve body, and frictional drag on the carrier is reduced by virtue of the possibility of rolling contact between the ball and valve body. By increasing the stem diameter, the force acting on the closure tending to open it is increased whereby the variation in opening force due to variation in gate seat friction with variation in downstream pressure is reduced.

BRIEF DESCRIPTION OF THE DRAWINGS

For a detailed description of a preferred embodiment of the invention, reference will now be made to the accompanying drawings wherein
FIG. 1 is an axial section through a relief valve embodying the invention.

Figure 1A:
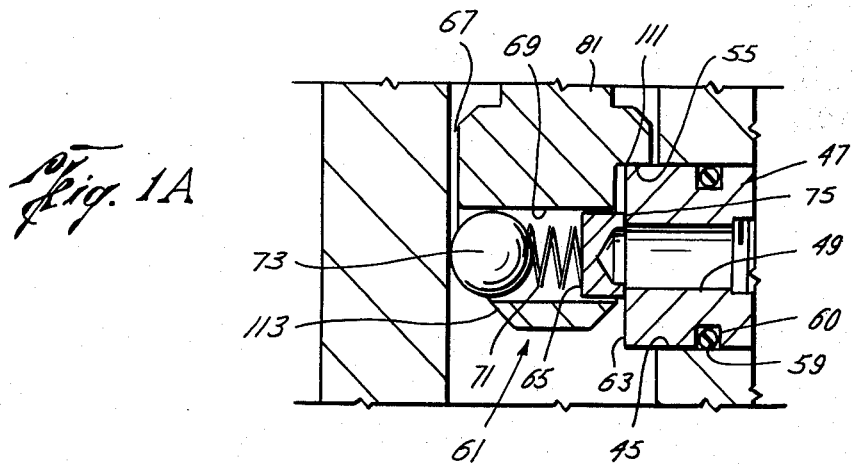
FIG. 1A is an enlargement of a portion of FIG. 1.
Figure 2:
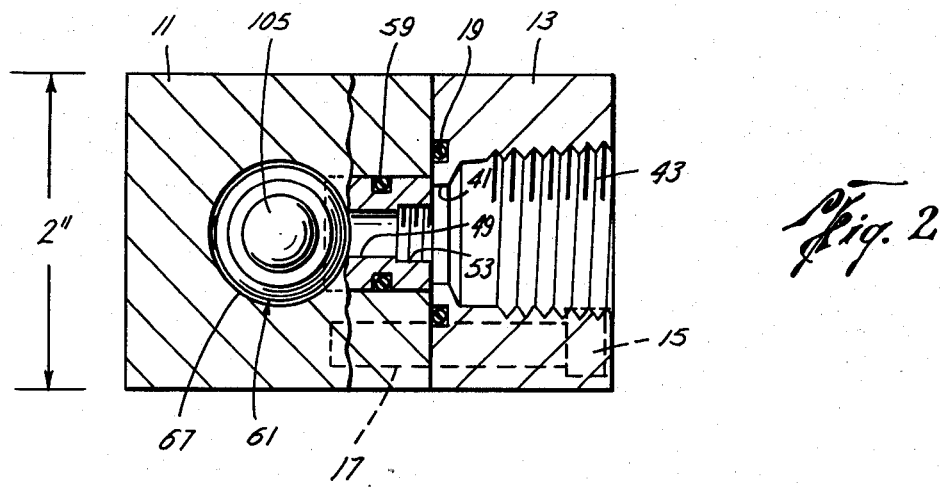
FIG. 2 is a section taken at planes 2—2 of FIG. 1.
Figure 3:
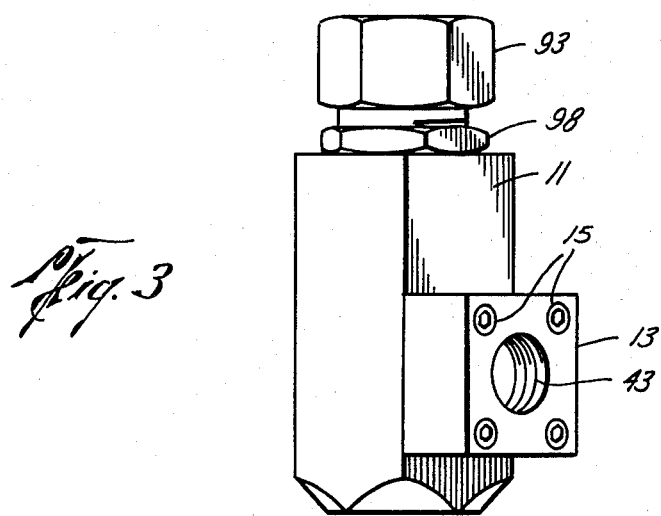
FIG. 3 is a perspective view of the valve.

The drawings are to scale, FIGS. 1 and 2 being to the same scale and FIG. 3 to a smaller scale. The conventions of the United States Patent and Trademark Office for patent cases are employed to designate materials, from which it will be seen that all parts are made of metal, e.g. steel, except for the cap plug and O-rings which are made of sealing material, e.g., an elastomer such as rubber.

DESCRIPTION OF PREFERRED EMBODIMENT

Referring now to the drawings and more particularly to FIG. 1, there is shown a valve including a body 9 comprising a main body part 11 and an outlet body part 13. The two parts are generally rectangular parallelepipeds secured together by four cap screws 15 extending through holes in corners of body part 13 into threaded holes 17 in body part 11. An O-ring 19 received in an annular groove 21 in one side of body part 13 seals with the adjacent side of body part 11.

A cylindrical bore provides an axial passage 31 in body part 11. The passage has a taper threaded socket at one end providing an inlet 33 adapted to make a threaded connection with a pipe leading to a hydraulic fluid vessel or line whose pressure is to be limited by this valve.

A cylindrical bore 41 in the outlet part 13 of the body provides a lateral passage in the body. The passage has a taper threaded socket at its outer end providing an outlet 43 adapted to make a threaded connection with a pipe leading, e.g., to a receiver or reservoir of hydraulic fluid. The passage further includes cylindrical bore 45 in main body part 11. A cylindrical seat ring 47 received in bore 45 provides a valve seat. Seat ring 47 has a passage 49 extending axially therethrough. Bore 45 is of larger diameter than bore 41. Seat ring 47 abuts against the shoulder 51 formed at the juncture of bores 41 and 45. The outer end of passage 49 is threaded at 53 (FIG. 2) to receive a seat removal tool. When it is desired to replace seat ring 47, screws 15 are taken out, body part 13 is removed, a removal tool is screwed into the threaded end 53, and seat ring 47 is pulled out. By the reverse procedure a new seat ring can be installed. An O-ring 59 received in an annular groove around the seat ring seals between the seat ring and bore 45.

The inner end of seat ring 47 protrudes into axial bore 31 in the main body part and its upper edge 55 provides a stop for positioning valve closure 61. The inner face 63 of seat ring 47 is planar and adapted to seal with gate or seal disc 65 of the valve closure.

Valve closure 61 is generally cylindrical but of smaller diameter than bore 31 leaving annular clearance space 67 (FIG. 1A) therebetween. A transverse passage 69 extends through closure 61. Passage 69 is cylindrical. Within passage 69 is helical pressure spring 71 which bears at one end against ball 73 and at the other end against gate or seal disc 65 and is slightly compressed when assembled in the valve. The pressure of the axially compressed spring presses the disc against the face 63 of the seat ring. The gate is a cylindrical disc hollowed out on its side adjacent face 63, forming an annular lip 74 which extends around and overlaps the periphery of passage 49 in the seat ring, sealing off the passage as long as the disc and seat ring are coaxial. The reaction of pressure spring 71 is transferred to bore 31 by ball 73. Ball 73 is slightly smaller in diameter than passage 69 so that the ball is free to slide and roll in passage 69 and bore 31. Since the ball is immersed in hydraulic fluid when in use, the ball is lubricated.

The outer diameter of disc 65 is slightly smaller than that of passage 69 so that the disc can slide freely in the passage and can cant slightly to insure that lip 75 seats completely against seat ring face 63. The force of pressure spring 71 is very small, being of the order of magnitude of an ounce, so that the gate-seat friction due to the force of the pressure spring is negligible compared to that generated by the pressure of hydraulic fluid against the gate. The hydraulic pressure may be as high as 30,000 psi. Acting over the area of the passage 49 a force of up to several thousand pounds may be exerted on the gate by the inlet fluid pressure.

A valve stem 81 extends coaxially from closure 61 away from inlet 33 into cylindrical bore 83. An O-ring 85 in a circumferential groove 87 around stem 81 seals the stem to the body of bore 83. The stem is of larger diameter than seat ring passage 49, i.e., the cross section of stem 81 is larger than the area of seal disc 65 exposed to the differential of inlet and outlet pressure. Therefore, the force of the fluid pressure tending to move closure 61 toward stem bore 83 is greater than the fluid force tending to hold the seal disc against its seat. Since the friction force created between the gate and seat by the normal force therebetween is only a small percentage of the normal force, it will be seen that variations in the friction force due to variation in outlet pressure will be reduced compared with the situation if the valve stem diameter were smaller than the diameter of bore 49.

From main body 11 extends an annular cuff or sleeve 91 which is interiorly straight threaded. A hexagonal cap 93 having an exteriorly straight threaded skirt 95 is screwed into cuff 91. Cap 93 with its skirt 95 forms a spring chamber within which is disposed helical compression load spring 97. The upper end of the spring bears against cap 93, so that by adjusting the degree of makeup of the skirt and cuff the compression of the load spring can be adjusted. A lock nut 98 holds the parts in the adjusted position.

The lower end of spring 97 bears against a circular plate 99. Plate 99 has a short center post 101 on its outer face which fits inside the lower end of spring 97 and a conical socket 103 on its inner face which rests on hemispherical end 105 of stem 81.

A cup shaped plastic plug 107 is pressed into a port 109 in the top of cap 93. In case fluid leaks past stem 81 into the spring chamber, the plug will be forced out to relieve the pressure. However even with plug 107 in place, the spring chamber is in communication with the ambient exterior of the valve via the threads interconnecting the cap and body so that the upper end of stem 81 is normally exposed to ambient pressure.

Load spring 97 pushes stem 81 down until shoulder 111 on closure 61 rests on upper edge 55 of the inner end of seat ring 47 which protrudes into passage 31. In this position seal disc 65 is coaxial with seat ring passage 49 and the valve is closed. If the inlet pressure rises sufficiently to overcome the force of spring 97 and the gate-seat friction, the closure compresses the spring, the gate seat disc moves away from coaxiality with passage seat ring passage 49, and the valve is open.

A reduction in inlet pressure will allow the load spring to return the valve to closed position. The lower end of closure 61 is bevelled at 113 to prevent any hang up during closure and when the valve is open to increase the size of the flow passage and reduce turbulence of flow.

The valve construction is such that the carrier retains the ball, spring, and seal disc as long as the carrier is in the body. The closure is inserted in the body before the load spring is compressed and before the outlet part of the body and seat ring are assembled. Once the seat ring is in place and the outlet part of the body is secured to the main part, the carrier is locked in the body by the seat ring and the seat ring is captured between the carrier and the outlet part of the body. The valve is therefor not apt to fall apart despite its simple, economical construction.

The valve has been built and operated successfully. While a preferred embodiment of the invention has been shown and described, modifications can be made without departing from the spirit of the invention.

I claim:

1. A gate valve comprising,
a body having an axial passage and a lateral passage transecting the axial passage interiorly of the body, the outer ends of the axial and lateral passages providing an inlet and outlet respectively, the inner end of the lateral passage providing a valve seat,
a closure axially movable in the axial passage between a valve closed position blocking flow through the lateral passage and a valve open position in which flow through the lateral passage is possible,
said closure including a gate adapted to close the lateral passage in the valve closed position, a pressure spring urging the gate against the valve seat, and a ball transferring the spring reaction to the wall of the axial passage.

2. A valve comprising a hollow body having an inlet and an outlet,
a seat about the outlet providing a face adapted to engage a gate,
a closure mounted for movement relative to the seat between a closed position engaging the seat face and blocking flow through the outlet and an open position in which flow through the outlet is possible,
said closure including a carrier having a passage therethrough in which are slidably disposed a gate adapted to engage the seat face and block the outlet when the valve is in closed position, a pressure spring pressing the gate against the seat when the valve is in closed position, and a ball transferring the reaction of the spring to the body.

3. A valve according to claim 1,
said axial passage being generally cylindrical and communicating with the exterior of the body at one end providing said inlet, the other end of the bore being closed except for a port extending to the exterior of the body providing a stem guide,
said closure being reciprocable in said bore and having a stem extending in said port and slidably sealed thereto,
a seat ring in said lateral passage sealed thereto, the seat ring extending into said axial passage past a shoulder on the closure to retain the closure in the body.

4. Valve according to claim 3,
the body thus far described forming a main body part, the body further including an outlet part secured to the main body part over said lateral passage retaining said seat ring in said body.

5. Valve according to claim 4, the outer end of the stem having a hemispherical tip, a plate having a conically dished side engaging said tip and on the other side of the plate a center post, a helical spring coaxial with the center post engaging the plate, and a screw cap threadedly engaging a threaded cuff extending from the body and bearing on the spring at its end opposite from that which engages the plate.

6. A valve according to claim 1, said valve seat having a face, said valve closure being movable relative to the seat face between a closed position blocking flow through the outlet and an open position wherein flow through the outlet is possible, said closure including a passage thereacross in which is slidably mounted said gate, said gate being engageable with the seat face to block flow through the outlet when the valve is in closed position, said closure including a stem extending into a port through a wall of the body in slidable sealing engagement therewith, and spring means engaging said stem urging the closure to valve closed position, the cross-sectional area of said stem where it extends into said port being greater than the area of the gate exposed to fluid pressure in the outlet.

7. Valve according to claim 1, said seat defining a port communicating with the outlet, said gate having an annular lip on its face adjacent the seat, the lip extending around and overlapping the seat port.

8. Valve according to claim 1, said closure including a stem extending slidably sealingly into a port through the body, spring means engaging said stem urging the stem inwardly, and stop means limiting inward movement of the closure normally positioning the closure in valve closed position.

9. Valve according to claim 1, said seat comprising a seat ring mounted in the lateral passage and extending into the axial passage to provide said stop means.

10. Valve according to claim 9, said closure being a generally cylindrical member coaxial with said axial passage and radially spaced therefrom, the end of the closure opposite said stem being frustoconical.

11. A gate valve comprising a hollow body having an inlet and an outlet, a valve seat about said outlet having a face, a valve closure movable relative to the seat face between a closed position blocking flow through the outlet and an open position wherein flow through the outlet is possible.

said closure including a passage thereacross in which is slidably mounted a solid disc gate engageable with the seat face to block flow through the outlet when the valve is in closed position, said closure including a stem extending into a port through a wall of the body in slidable sealing engagement therewith, and spring means engaging said stem urging the closure to valve closed position, the cross-sectional area of said stem in said port being greater than the area of the solid disc gate exposed to fluid pressure in the outlet.

12. A valve according to claim 11, said hollow body having sides and two ends, the interior of said body communicating with the exterior of the body at one end providing said inlet, the other end of the body being closed except for said port, said closure being reciprocable in said body along a line between said ends, said spring means acting on said stem urging said closure means toward said one end of the body, a transverse opening through a side of the body providing said outlet, a seat ring in said opening sealed thereto, said closure having a stop shoulder facing said inlet, said seat ring extending into said bore past said shoulder on the closure to retain the closure in the body, and when said closure is in closed position said spring means urging said shoulder on the closure into engagement with said seat ring.

13. Valve according to claim 12, the body thus far described being of one piece and forming a main body part, the body further including an outlet part secured to the body over said opening retaining said seat ring in said body and thereby retaining the closure in the body.

14. Valve according to claim 12, said main body part having a generally cylindrical bore therein forming the hollow interior of the body, said bore being coaxial with the line of reciprocation of said closure, said closure being generally cylindrical coaxial with said line, the outer end of the stem having a hemispherical tip, a plate having on one side a conically dished side engaging said tip, the other side of the plate having a center post, said spring means including a helical spring coaxial with the center post engaging the plate, and an internally threaded screw cap threadedly engaging an interiorily threaded cuff extending from the body, said cap bearing on the spring at its end opposite from that which engages the plate and extending down along the length of the spring across the turns thereof.

* * * * *

UNITED STATES PATENT AND TRADEMARK OFFICE
CERTIFICATE OF CORRECTION

PATENT NO. : 4,456,028
DATED : JUNE 26, 1984
INVENTOR(S) : RICHARD R. WATSON

It is certified that error appears in the above—identified patent and that said Letters Patent is hereby corrected as shown below:

Cover Page, Line 26; after "Attorney, Agent, or Firm" change "Robinson Murray" to -- Murray Robinson --.

Column 1, line 62; change "gate seat" to -- gate-seat --.

Column 2, line 65; delete "74 and insert -- 75 --.

Claim 14, Column 6; line 37; delete "12" and insert -- 13 --.

Signed and Sealed this

Twenty-fifth Day of December 1984

[SEAL]

Attest:

GERALD J. MOSSINGHOFF

Attesting Officer

Commissioner of Patents and Trademarks